United States Patent [19]

MacAnally

[11] 3,940,274

[45] Feb. 24, 1976

[54] SINGLE EMULSION PHASE AND AMPLITUDE TRANSPARENCY

[75] Inventor: Richard B. MacAnally, Altadena, Calif.

[73] Assignee: California Institute of Technology, Pasadena, Calif.

[22] Filed: Dec. 26, 1973

[21] Appl. No.: 428,443

[52] U.S. Cl................ 96/38.3; 96/27 R; 96/27 H; 96/27 E; 96/68; 96/73; 96/74; 354/120
[51] Int. Cl.$^2$. G03C 5/00; G03C 11/00; G03C 5/04
[58] Field of Search ....... 96/74, 68, 27 R, 73, 27 H, 96/27 E, 38.3; 354/120; 350/162 R, 162 SF

[56] References Cited
UNITED STATES PATENTS

| | | | |
|---|---|---|---|
| 3,574,616 | 4/1971 | Mueller | 96/27 R |
| 3,765,893 | 10/1973 | Lohmer | 96/74 |
| 3,777,633 | 12/1973 | Kirk | 96/38.3 |
| 3,820,992 | 6/1974 | Bestenreiner et al. | 96/27 R |

OTHER PUBLICATIONS

Chu et al., "Multiemulsion On–Axis Computer Generated Hologram", 7/73, *Applied Optics*, Vol. 12, p. 1386.

*Primary Examiner*—Edward C. Kimlin
*Attorney, Agent, or Firm*—Lindenberg, Freilich, Wasserman, Rosen & Fernandez

[57] ABSTRACT

There is provided a simple method and means for recording in any single-emulsion photographic film or plate an optical transparency which independently controls both the amplitude and the phase of the transmitted light at each transverse coordinate of the transparency according to predetermined spatial patterns. The phase and amplitude information are recorded at separate levels within the emulsion.

15 Claims, 8 Drawing Figures

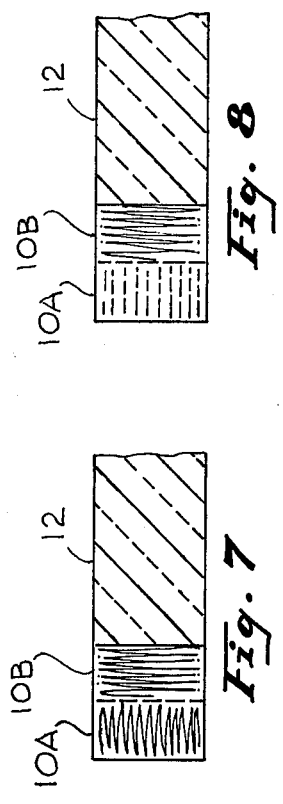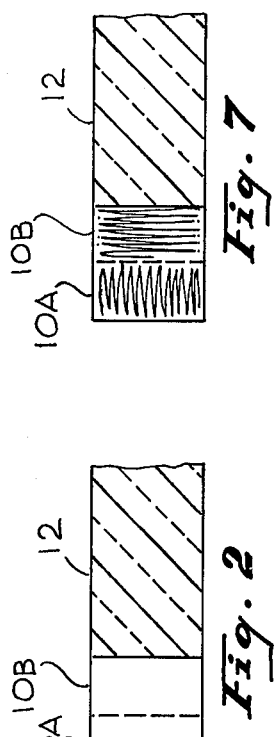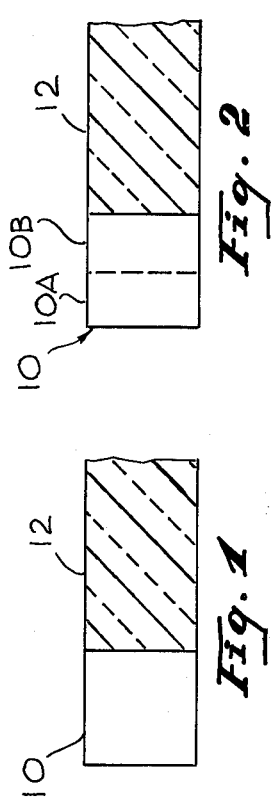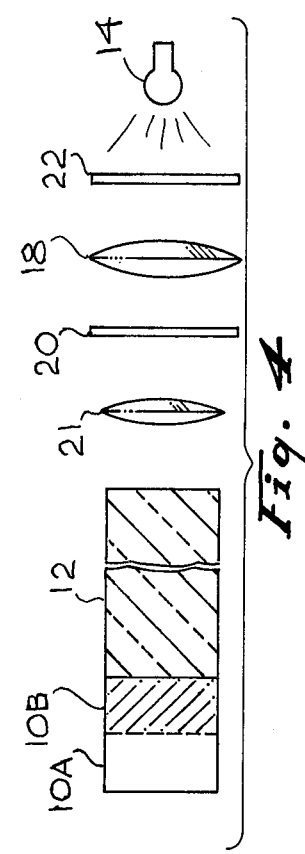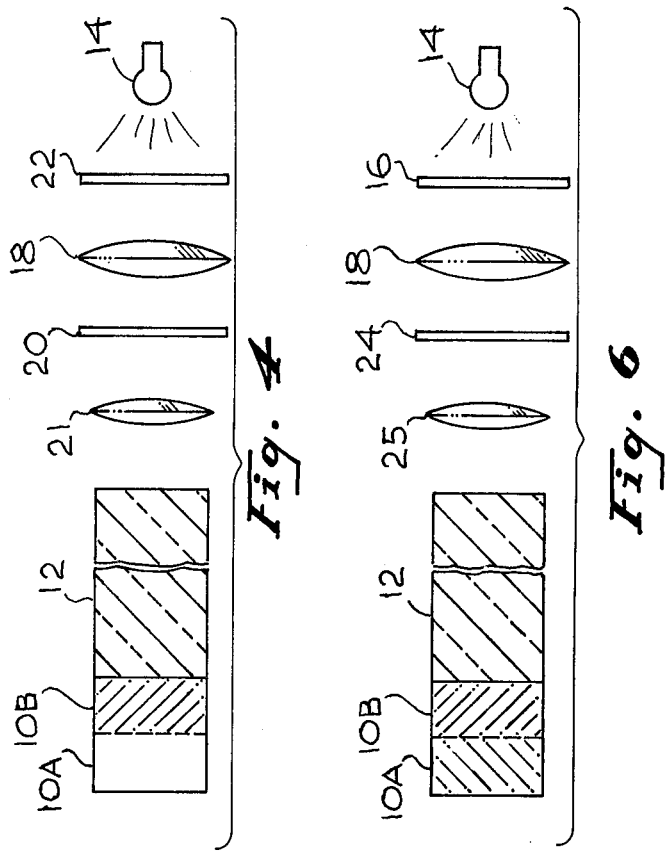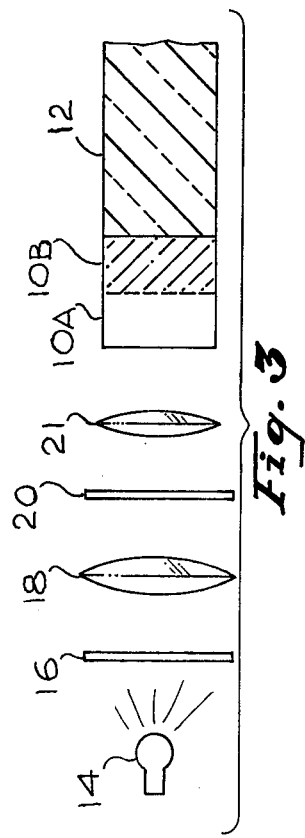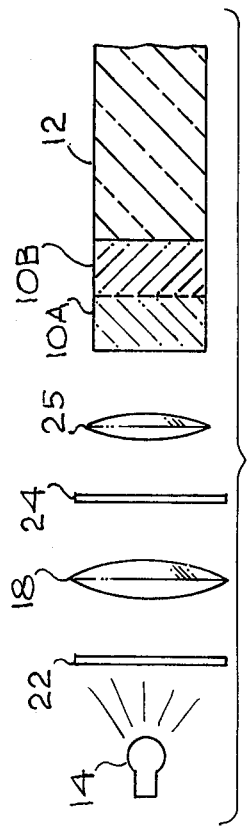

SINGLE EMULSION PHASE AND AMPLITUDE TRANSPARENCY

ORIGIN OF INVENTION

The Government has rights in this invention pursuant to Grant No. GK32456 awarded by the National Science Foundation, and pursuant to work performed in the course of or under Grant No. AFOSR-72-2234 with the Department of Air Force.

BACKGROUND OF THE INVENTION

This invention relates to a method and means of processing any single-emulsion photographic film or plate in a manner so that it has certain characteristics of a double emulsion film or plate thereby rendering it capable of recording phase and amplitude information at separate depths of the emulsion.

The central problem in computer generated optics and holography is obtaining a high resolution transparency of superior optical quality which can control both the amplitude and the phase of transmitted light at each point in accordance with a computed complex function. In attempting to solve this problem, a number of different approaches have been taken including making a sandwith of two independent transmitting layers. However, the solutions including the making of the sandwich structure are not simple to either make or use and often produce deleterious and unwanted side effects. In a scientific journal, "Applied Optics", July, 1973, Volume 12 No. 7, page 1386, there is described in an article entitled "Multi-Emulsion On-Axis Computer Generated Hologram" a solution which utilizes color film. However, color film is a multi-emulsion film, the characteristics of which are optimized by the manufacturer for purposes of color photography, not for computer generated optics.

OBJECTS AND SUMMARY OF THE INVENTION

An object of this invention is to provide a method and means for producing in any single-emulsion photographic film or plate an optical transparency wherein both the amplitude and the phase of transmitted light are independently controlled.

Yet, another object of this invention is the provision of a novel method and means of imparting to a single emulsion photographic film or plate, certain characteristics of a double emulsion film or plate whereby the amplitude and the phase light modulation provided by two separate transparencies may be incorporated on a single transparency recorded on said emulsion, so that light passing through said emulsion is independently spatially modulated by said amplitude and phase modulations recorded on said emulsion.

These and other objects of the invention may be achieved with single emulsion film by processing in a manner to impart certain characteristics of a double emulsion film.

First the emulsion is dyed red in order to prevent a blue image projected onto the emulsion from penetrating more than half way through the emulsion layer.

Then a portion, approximately the outer half layer of the emulsion is rendered sensitive to red light if the film emulsion is orthochromatic or insensitive to red light if the film emulsion is panchromatic.

Next, the spatial pattern of the desired amplitude modulation is photographed using red light onto the red sensitive half layer of the film. Thereafter, the spatial pattern of the phase modulation desired is registered with the amplitude pattern and then photographed using blue light onto the remaining half layer of the emulsion.

The doubly exposed emulsion is then developed and fixed in a conventional manner, appropriate for the emulsion selected.

Next, the developed and fixed plate is placed into a controlled penetration bleach for the period of time required to convert one of the two patterns which has been photographed and is now in the form of a developed silver image to be converted to a phase modulated image such as a silver halide image. The film is then immersed into a bleach stop bath, washed and dried.

The novel features of the invention are set forth with particularity in the appended claims. The invention will best be understood from the following description when read in conjunction with the accompanying drawings.

BRIEF DESCRIPTION OF THE DRAWINGS

FIG. 1 is a cross-sectional representation of a sensitized single emulsion layer on a base.

FIG. 2 is a schematic and cross-sectional representation of a film in which a portion of the emulsion layer has been color sensitized or desensitized in accordance with this invention.

FIG. 3 illustrates schematically how the panchromatic emulsion film is illuminated for recordation of an amplitude modulated mask.

FIG. 4 is a schematic illustration of how the orthochromatic emulsion film is illuminated for recordation of the amplitude modulated mask.

FIG. 5 is a schematic illustration showing how the panchromatic emulsion film is illuminated for recordation of the phase modulated mask.

FIG. 6 is a schematic illustration illustrating how the orthochromatic emulsion film is illuminated for recordation of the phase modulated mask.

FIG. 7 is a cross-sectional and schematic representation illustrating the appearance of the film after development, and FIG. 8 is a cross-sectional representation of the appearance of the film after converting the silver image of the phase portion of the film into a silver halide image.

DESCRIPTION OF THE EMBODIMENTS OF THE INVENTION

The processing that will be described, which the film undergoes, is in order to impart to the single emulsion layer film characteristics of the double emulsion layer.

At the outset, the film, whether orthochromatic or panchromatic has the emulsion dyed red by immersion in a solution of Erythrosin Indicator dye. The function of the red dye is to prevent a blue image, projected onto the emulsion, as will be described subsequently herein, from penetrating more than halfway through the emulsion layer. The dye solution is formed by adding 1 gram of dye stuff to 60 ml of deionized water. The unexposed plates are immersed in the dye solution for five minutes at room temperature, are then washed for two minutes in 100% methanol, and then dried in a closed container for two hours.

FIG. 1 provides a cross-sectional representation of film, whether it be orthochromatic or panchromatic. The film has a sensitized emulsion layer 10 which is applied to a support or base 12. The support is transparent.

If the unprocessed emulsion is orthochromatic, then it is next immersed in a controlled penetration red sensitizer, such as cryptocyanine in a solution of 2 parts glycerol and 1 part water and then washed off with 100% methanol and dried. The function of the red sensitizer is to cause that portion of the emulsion lying in a layer of thickness approximately one half of the emulsion thickness and extending from the outer emulsion surface toward the support base (region 12) to become sensitized to red light.

If the unprocessed emulsion is panchromatic, then it is next immersed in a controlled penetration red or red-green anti-sensitizer, compatible with the sensitizers incorporated in the emulsion at manufacture and then washed off with 100% methanol.

A typical anti-sensitizer formulation comprises

| | |
|---|---|
| Pontacyl Rubin R dye (sold by E. I. Dupont Nemours and Co. Dyes and Chemicals Division, Wilmington, Delaware) | 2.5 grams |
| Deionized water | 300 ml |
| Acetic acid | 5 ml |
| Glycerol | 600 ml |

The dye stuff should first be dissolved in the water, then the acetic acid added, and then the resulting solution combined with the glycerol.

the function of the anti-sensitizer is to cause that portion of the emulsion lying in a layer of thickness approximately one half the emulsion thickness and extending from the outer emulsion surface towards the support base to become insensitive to red, or red and green light.

This is represented in FIG. 2 where a dotted line divides the emulsion layer 10 into two halves approximately, 10A and 10B. Where the film emulsion is orthochromatic, then the portion 10A of the layer 10 is red sensitized by the treatment just described. Where the emulsion of the film is panchromatic, then the portion 10A of the layer 10 is insensitive to red or red and green light.

Now, if hypersensitization is desired, the film, whether having an orthochromatic or a panchromatic emulsion layer, may be preflashed with a strobe light and hypersensitized with ammonia or triethanolamene. The function of this step is to compensate for the effective loss of film speed caused by the non-uniform spectral sensitization imparted to the emulsion by the treatment previously described. This step is optional if increased speed is desired, otherwise it may be omitted.

Considering now the treated film with a panchromatic emulsion, FIG. 3 shows how an amplitude modulated mask is recorded on the film. A source of light, 14, shines through a red filter 16. The light that passes through the red filter, 16, is gathered by the lens 18 and is transmitted through the amplitude modulated mask, 20. The light from the mask 20 is focussed by a lens 21 onto the surface of the emulsion, 10A. Since the back half, 10B, of the emulsion was left sensitive to red light, this is where the recordation takes place, as represented by the diagonal lines.

Referring to FIG. 4, there is illustrated how the amplitude modulated mask is photographed onto the orthochromatic emulsion film. A light source 14 illuminates a blue filter 22. The light passing through the blue filter 22 is gathered by the lens 18 for transmittal through the amplitude modulated mask 20, and through a focussing lens 21 onto the base support 12. The mask markings are recorded by the back half, 10B, of the emulsion which was left blue light sensitive. The remaining half 10A was made red light sensitive.

FIG. 5 illustrates illumination of the panchromatic emulsion film with a phase modulated mask. The light source 14 illuminates a blue filter 22. The lens 18 collects the light from the blue filter and transmits it through a phase modulated mask 24 and through a focussing lens 25 onto the emulsion surface of the panchromatic film. The front half 10A of the emulsion, which was left blue light sensitive records the phase modulated mask.

FIG. 6 illustrates the method of illumination for recordation of the orthochromatic emulsion film with a phase modulated mask. The light source 14 illuminates a red filter 16. Light from the red filter is collected by the lens 18 and applied through the phase modulated mask 24, and the focussing lens through the base support 12, for the orthochromatic film onto the emulsion. The front half, 10A, of the emulsion, which was rendered red sensitive will record the red light image of the phase mask.

It should be noted that it is absolutely necessary that the mask with the amplitude modulation pattern should be in correct registration with the mask having the spatial modulation pattern. The film in either the orthochromatic or panchromatic case should not be moved between the two exposures.

The spatial masks, both the phase and the amplitude, used here can be produced in many ways. They may be simple line drawings made by hand, or they may be computer generated holograms or complex valued spatial filters displayed on a cathode ray tube, or other forms of computer generated patterns. Regardless of how they are derived and fabricated, both the amplitude and phase masks should have common fiducial marks to assist in accurate registration. In addition, a small area near one edge of each mask must be reserved to function as a monitor for obtaining accurate, controlled penetration bleaching in one of the steps that follows. In the monitor area, the amplitude mask should be opaque so that the corresponding developed silver image is clear. A corresponding area on the phase mask should be clear so that the developed silver image is dark. The masks may be of any size, but if they are large, and the focusing lens provides at least 5 to 1 demagnification, the registration problem is minimal. In fact, great accuracy in the final phase and amplitude transparency may be achieved by making the masks with an automatic photolithographic plotter and then using a precision microphotographic reduction camera, such as is used to fabricate integrated circuits, to perform the photographic steps just described.

The red and blue light requirement can be obtained by placing appropriate filters on the camera lens, or on the lights, or by using masks which are themselves colored.

The doubly exposed plate is developed and fixed in a conventional manner appropriate for the emulsion selected. FIG. 7 is a schematic view of the developed film. A developed silver image of the phase mask is found in the outer half, 10A, of the film emulsion, whether orthochromatic or panchromatic. The remaining half of the film emulsion, 10B, has a developed silver image of the amplitude mask.

In order to convert the silver image of the phase mask in the region 10A, which is now an amplitude variation, into a phase variation, one technique is to convert the silver image into a silver halide image. As represented in FIG. 8 of the drawings, the developed and fixed film is immersed into a controlled penetration bleach until the monitor area, which was established during the exposure of the film as described previously, just clears. A suitable controlled penetration bleach consists of 200 grams of cupric bromide, dissolved in 200 ml of water. This is then added to 500 ml glycerol. In order to totally convert the silver to silver halide in the layer 10A, it is not only necessary that the bleach penetrates slowly, but it is necessary that it convert each silver grain rapidly. Thus, the ideal control penetration bleach should have a high concentration of bleaching agents in a relatively undiluted glycerol carrier.

Immediately upon clearing of the monitor area, the plate is immersed in a bleach stop bath. The purpose of the stop bath is to quench the bleaching process quickly before it can act upon the amplitude pattern in layer 10B. For this purpose, the stop bath must penetrate the emulsion as rapidly as possible.

The exact formulation of the stop bath required depends upon the emulsion thickness. For a very thick emulsion such as Kodak 649F (17 microns thick) vigorous agitation in an inert bath such as deionized water is adequate. For a very thin emulsion such as Kodak High Resolution Plate Type 2 (6 microns thick) a chemically active stop bath is essential. For the latter, 8 grams of Sodium Hydroxide in 1000 ml water is adequate.

The film is then washed in 100% methanol for five minutes and dried.

As a result of the foregoing process, the film provides a single emulsion optical transparency which independently phase modulates and amplitude modulates light transmitted therethrough, in accordance with the spatial patterns that have been recorded.

As a suitable alternative for some emulsion types to the process which has been described, prior to dying the emulsion in the film red, the unexposed film, whether orthochromatic or panchromatic, may be immersed in a solution which dissolves the sensitizer dyes incorporated during manufacture. For example, for Kodak High Resolution Plate Type 2, 50 grams of sodium carbonate per liter of deionized water is appropriate. As a result, all emulsion sensitizer dyes are bled from the emulsion and only the intrinsic blue sensitivity of the emulsion remains. Then the processing may proceed in the same manner as has been described for orthochromatic film. This step has three advantages. First, "crosstalk" between the phase and amplitude patterns which are recorded, is reduced by removing the green sensitivity so that spectral overlap is minimized. Second, it is easier to sensitize an emulsion than to anti-sensitize. Third, removing the sensitizers often increases blue sensitivity.

Prior to washing and drying, the film may be immersed in a basic solution of 50 grams of sodium carbonate per liter of deionized water to remove the blue light penetration controlling dye.

If it is possible to reverse the film between amplitude mask recordation and phase mask recordation steps, so that for one exposure the light comes through the support and for the other exposure the light comes through the emulsion outer surface, then it is not necessary to use the red sensitizer for the orthochromatic emulsion or the red and green anti-sensitizer for the panchromatic emulsion. One can merely use blue light for both exposures, reversing the film front-to-back, between them. This also permits dyes other than red to be used to control image penetration, as long as the appropriate light is used during the recordation steps and as long as the emulsion is sensitive to light of that wave length.

If the total dynamic range required for the amplitude and phase silver images is within the capacity of the emulsion, then it is not necessary to use the red and green anti-sensitizer for the panchromatic emulsion. Then the amplitude mask exposure will form an image in both half-layers of the emulsion. The amplitude mask image recorded using red light in the phase layer can be compensated for by next making an exposure in light of the opposite color which is blue light using as target the negative of the amplitude mask, so that the total exposure in the phase half-layer is uniform after the second step. Then the phase mask exposure can be made in the normal way. The compensation could also be made by modifying the phase mask in which case only two exposures would be needed, one with the original amplitude mask, and the other with the modified phase mask. Development and bleaching would then proceed as previously described herein. The final result would be identical with the more elaborate procedure except that the phase shift caused by the transparency would have an additional and meaningless constant term added to it.

Processing in the manner described for the single emulsion independent recordation of phase and amplitude has the advantage that the restrictions normally present with multi-layer emulsions or multiple plate techniques are eliminated. The emulsion used can be picked solely on the basis of speed, grain size and contrast without regard to any other considerations. The preexposure processing is simple and requires only simple equipment ordinarily available. The post exposure processing is also simple and does not require any accurate temperature control.

The method described also eliminates phase to amplitude crosstalk, and surface relief of the amplitude image is considerably reduced. Effective emulsion thickness is controllable. Finally, the only registration required is the positioning of the target masks which is usually done at large scale and hence is a minimal difficulty. The preexposure processing can be combined with special low noise processing often used in high resolution optical work.

In the description given above, reference is made to a phase modulated mask or a phase mask and to an amplitude modulated mask or an amplitude mask. It should be understood that these masks are all amplitude modulated. However, the modulations in the phase mask or phase modulated masks are representative of phase modulation and this is what is denoted herein when reference is made to a phase or phase modulated mask.

The embodiments of the invention in which an exclusive property or privilege is claimed are defined as follows:

1. The method of producing a transparency, from a single silver halide photosensitive emulsion layer deposited on a transparent substrate, in which both the amplitude and phase of light transmitted therethrough is independently spatially modulated, comprising
   rendering said emulsion insensitive to light of a particular color within a predetermined thickness thereof, measured from the outside surface of the emulsion toward the substrate, exposing said emulsion to an image of an amplitude mask in light of one color to which said emulsion, beyond said predetermined thickness, is sensitive, exposing said emulsion to an image of a phase mask in light of another color to which said remainder of said emulsion is sensitive, developing and fixing said film, to develop a silver image of said phase mask and of said amplitude mask therein, controllably bleaching the developed silver image of said phase mask to produce an image which has phase variation, and washing and drying said film.

2. The method as recited in claim 1 wherein and said step of exposing said emulsion to an image of an amplitude mask comprises, projecting said image in light of said one color on one surface of said emulsion;

said step of exposing said emulsion to an image of a phase mask includes, projecting said phase mask image in light of said another color on said one surface of said emulsion.

3. The method as recited in claim 1 wherein said step of rendering said emulsion insensitive to light of a particular color within a predetermined thickness thereby includes dying said emulsion with a dye of one color to prevent a subsequently projected image in another color from penetrating within said predetermined thickness of said emulsion, sensitizing said emulsion to a predetermined color within the predetermined thickness.

4. The method as recited in claim 1 wherein said step of rendering said emulsion insensitive to light of a particular color within a predetermined thickness thereof includes removing sensitizer dyes from said emulsion to leave said emulsion only blue light sensitive, sensitizing said predetermined thickness of said emulsion to light of a preselected color.

5. The method as recited in claim 3 wherein said step of sensitizing said emulsion to a predetermined color and within the predetermined thickness includes making a red sensitizing solution, immersing the surface of said emulsion into a layer of said red sensitizing solution, and removing said solution after a predetermined interval for sensitizing said emulsion to said predetermined depth.

6. The method of producing a transparency, from a single silver halide photosenseitive emulsion film deposited on a transparent substrate, in which both the amplitude and phase of light transmitted therethrough is independently spatially modulated, comprising dying said emulsion with one color to prevent a subsequently projected image in another color from penetrating more than a predetermined distance through said emulsion, rendering said predetermined distance of said emulsion sensitive to light of a color which is different from the light color sensitivity of the remaining portion of said emulsion, projecting an image of an amplitude mask in light of the color to which said predetermined distance of emulsion is sensitive at said emulsion, projecting an image of a phase mask in light of the color to which the remaining portion of said emulsion is sensitive at said emulsion, projecting an image of a phase mask in light of the color to which the remaining portion of said emulsion is sensitive at said emulsion, developing and fixing said film, controllably bleaching the developed image of said amplitude mask in said developed and fixed film to produce a silver halide image, and washing and drying said film.

7. The method of producing a transparency in which both the amplitude and phase of light transmitted therethrough is independently spatially modulated, using a single silver halide photosensitive emulsion photographic film, wherein said emulsion is deposited on a transparent base, comprising dying said emulsion red to prevent a blue image subsequently projected onto the emulsion, from penetrating more than a predetermined distance through the emulsion layer, altering the sensitivity of said emulsion to red light to said predetermined distance extending from the surface of said emulsion layer, to render orthochromatic film sensitive to red light and panchromatic film insensitive to red light, exposing an amplitude mask to said film using light of one color for recording said amplitude modulated mask in the portion of said emulsion whose sensitivity to red light has not been altered, exposing a phase mask to said film with light of second color, for recording phase modulations of said mask in the portion of said emulsion whose sensitivity to red light has been altered, developing and fixing said film, controllably bleaching the developed image of said phase mask to produce a silver halide image of said phase mask, and washing and drying said film.

8. A method as recited in claim 7 wherein said step of altering the sensitivity of said emulsion to red light to said predetermined distance for panchromatic film comprises adding a solution of Pontacyl Rubine R dye to a mixture of 2 ml concentrated acetic acid in 150 ml of the ionized water, immersing said film in said dye solution for five minutes, washing said film for ten minutes in water, and drying said film with isopropyl alcohol.

9. A method of claim 7 wherein said step of altering the sensitivity of said emulsion to red light to said predetermined distance, for orthochromatic film, comprises mixing a solution of cryptocyanine with a solution of glycerol and alcohol to make a red sensitizer solution, painting a layer of said red sensitizer solution over the surface of said emulsion, washing said layer off the surface of said film with isopropyl alcohol after an interval long enough to sensitize said emulsion to said predetermined depth, and drying said film.

10. The method as recited in claim 7 wherein the step of altering the sensitivity of said emulsion to red light to said predetermined distance extending from the surface of said emulsion layer where said film emulsion is panchromatic, comprises applying a solution of a red anti-sensitizer to the emulsion surface compatible with the sensitizer incorporated in said emulsion for a predetermined interval, washing said red anti-sensitizer off said surface with isopropyl alcohol, and drying said film.

11. A method as recited in claim 7 wherein, when said film emulsion is orthochromatic, said light in said step of exposing an amplitude modulated mask to said film, is blue light, and wherein said light from said mask is directed at the support for said emulsion.

12. The method as recited in claim 7 wherein, when said film emulsion is panchromatic, said light in said step of exposing an amplitude modulated to said film is red light, and said light from said mask is directed at the emulsion of said film.

13. The method as recited in claim 7 wherein, when said film emulsion is orthochromatic, said light in said step of exposing said phase modulated mask to said film is red, and said light from said mask is directed at the support for said film.

14. The method as recited in claim 7 wherein, when said film emulsion is panchromatic, said light in said step of exposing said phase modulated mask to said film is blue and said light from said phase modulated mask is directed at the emulsion surface of said film.

15. The method as recited in claim 7 including the steps of flashing said emulsion layer with a strobe light, and hypersensitizing said emulsion layer.

* * * * *